United States Patent
Grobe

(10) Patent No.: US 9,838,112 B2
(45) Date of Patent: Dec. 5, 2017

(54) METHOD AND APPARATUS FOR PROVIDING A DIFFERENTIAL LATENCY

(71) Applicant: ADVA Optical Networking SE, Meiningen OT Dreissigacker (DE)

(72) Inventor: Klaus Grobe, Planegg (DE)

(73) Assignee: ADVA OPTICAL NETWORKING SE, Meiningen ot Dreissigacker (DE)

( * ) Notice: Subject to any disclaimer, the term of this patent is extended or adjusted under 35 U.S.C. 154(b) by 62 days.

(21) Appl. No.: 14/928,269

(22) Filed: Oct. 30, 2015

(65) Prior Publication Data
US 2016/0134364 A1    May 12, 2016

(30) Foreign Application Priority Data

Nov. 7, 2014 (EP) ..................................... 14192186

(51) Int. Cl.
  *H04B 10/077*  (2013.01)
  *H04L 7/00*   (2006.01)
  *H04B 10/071*  (2013.01)

(52) U.S. Cl.
  CPC ....... *H04B 10/0773* (2013.01); *H04B 10/071* (2013.01); *H04B 10/0775* (2013.01); *H04L 7/0075* (2013.01); *H04B 2210/078* (2013.01)

(58) Field of Classification Search
  CPC ... H04L 7/0075; H04B 10/073; H04B 10/071; H04B 10/0775
  See application file for complete search history.

(56) References Cited

U.S. PATENT DOCUMENTS

| | | | | |
|---|---|---|---|---|
| 5,510,917 A | * | 4/1996 | Corke .................. | H04B 10/077 398/34 |
| 2005/0019040 A1 | * | 1/2005 | Trutna, Jr. ......... | H04B 10/5053 398/183 |

(Continued)

FOREIGN PATENT DOCUMENTS

| | | |
|---|---|---|
| EP | 2 209 226 A1 | 7/2010 |
| WO | WO 2012/048975 A1 | 4/2012 |

(Continued)

OTHER PUBLICATIONS

Extended European Search Report for European Application No. 14192186.6 (dated Apr. 24, 2015)

*Primary Examiner* — David Payne
*Assistant Examiner* — Casey Kretzer
(74) *Attorney, Agent, or Firm* — Jenkins, Wilson, Taylor & Hunt, P.A.

(57) ABSTRACT

An apparatus and method for providing a differential latency, DL, between an upstream, US, transmission and a downstream, DS, transmission via an optical transmission link (OTL), said apparatus comprising a measurement unit (2) configured to measure the round trip delays, RTD, of at least two measurement signals having different measurement wavelengths; and a processing unit (3) configured to derive an upstream, US, delay of at least one optical signal at an upstream wavelength from the at least two measured round trip delays, RTD, and to derive a downstream, DS, delay of at least one optical signal at a downstream wavelength from the at least two measured round trip delays, RTD, wherein the differential latency, DL, is calculated on the basis of the derived delays, RTD.

27 Claims, 7 Drawing Sheets

(56) References Cited

U.S. PATENT DOCUMENTS

| | | | | |
|---|---|---|---|---|
| 2005/0141892 A1* | 6/2005 | Park | ................... | H04B 10/032 398/71 |
| 2013/0089336 A1* | 4/2013 | Dahlfort | ............. | H04J 14/0282 398/115 |
| 2013/0202291 A1* | 8/2013 | Cavaliere | ............... | H04B 10/07 398/33 |
| 2014/0334821 A1* | 11/2014 | Mehrvar | ............ | H04Q 11/0005 398/54 |

FOREIGN PATENT DOCUMENTS

| | | |
|---|---|---|
| WO | WO 2013/007318 A1 | 1/2013 |
| WO | WO 2013/139367 A1 | 9/2013 |

\* cited by examiner

METHOD AND APPARATUS FOR PROVIDING A DIFFERENTIAL LATENCY

PRIORITY CLAIM

This application claims the benefit of European Application No. 14192186.6, filed Nov. 7, 2014; the disclosure of which is incorporated herein by reference in its entirety.

FIELD OF THE INVENTION

The invention relates to a method and apparatus for providing a differential latency between an upstream and a downstream transmission via an optical transmission link.

TECHNICAL BACKGROUND

Some applications in an optical transport network require a very low differential latency between upstream, US, and downstream, DS, transmission via an optical transmission link comprising optical fibers. For example, in the common public radio interface CPRI, a very low differential latency is required. CPRI is a digital interface standard for encapsulating radio samples between a radio and a digital baseband processing unit. The CPRI interface is not packet-based. In the CPRI fronthaul, signals are multiplexed in a low latency time slot-like fashion. CPRI defines a maximum latency, a near-zero jitter and a near-zero bit error rate.

Accordingly, there is a need for a method and apparatus for measuring accurately a differential latency between an upstream and a downstream transmission performed via an optical transmission link.

SUMMARY OF THE INVENTION

This object is achieved according to a first aspect of the present invention by an apparatus comprising the features of claim 1.

The present invention provides according to a first aspect an apparatus for providing a differential latency between an upstream transmission and a downstream transmission via an optical transmission link, said apparatus comprising
a measurement unit configured to measure the round trip delays of at least two measurement signals having different measurement wavelengths, and
a processing unit configured to derive an upstream delay of at least one optical signal at an upstream wavelength from the at least two measured round trip delays and to derive a downstream delay of at least one optical signal at a downstream wavelength from the at least two measured round trip delays,
wherein the differential latency is calculated on the basis of the derived delays.

Accordingly, the apparatus of the present invention relies on round trip delay measurements of at least two different measurement wavelengths. The measurement of the differential latency is performed non-intrusively.

In a possible embodiment of the apparatus according to the first aspect of the present invention, the measurement unit comprises a measurement signal generator configured to generate the at least two optical measurement signals having different measurement wavelengths.

In a further possible embodiment of the apparatus according to the first aspect of the present invention, the at least two generated optical measurement signals are inserted at a near end of the optical transportation link by means of an add/drop filter connected to the measurement unit.

In a further possible embodiment of the apparatus according to the first aspect of the present invention, the at least two inserted optical measurement signals are transported through the optical transportation link to a far end of the optical transportation link and at least partially reflected by a signal reflector provided at the far end of the optical transportation link back to the add/drop filter provided at the near end of the optical transportation link and supplied to the measurement unit.

In a further possible embodiment of the apparatus according to the first aspect of the present invention, the measurement unit comprises a measurement signal detector configured to detect the reflected optical measurement signals received by the add/drop filter at the near end of the optical transportation link.

In a further possible embodiment of the apparatus according to the first aspect of the present invention, the measurement signal generator of the measurement unit is configured to generate optical measurement signals comprising a pulse sequence providing a narrow autocorrelation function in the time domain.

In a still further possible embodiment of the apparatus according to the first aspect of the present invention, the measurement signal detector of the measurement unit is adapted to detect the reflected optical measurement signals by performing an autocorrelation of the received reflected optical measurement signals with the generated transmitted optical measurement signals.

In a still further possible embodiment of the apparatus according to the first aspect of the present invention, the signal reflector at the far end of the optical transportation link is a fiber Bragg grating adapted to reflect the at least two optical measurement signals transported through said optical transportation link.

In a still further possible embodiment of the apparatus according to the first aspect of the present invention, the apparatus further comprises a differential latency compensation unit configured to compensate the differential latency.

In a still further possible embodiment of the apparatus according to the first aspect of the present invention, the differential latency compensation unit is configured to compensate the calculated differential latency statically.

In a still further possible alternative embodiment of the apparatus according to the first aspect of the present invention, the differential latency compensation unit is configured to compensate the calculated differential latency dynamically in response to the calculated differential latency output by the processing unit of said apparatus.

In a further possible embodiment of the apparatus according to the first aspect of the present invention, the processing unit is adapted to derive the upstream delay of the at least one optical signal at an upstream wavelength and the downstream delay of the at least one optical signal at a downstream wavelength from the at least two measurement round trip delays by linear or non-linear interpolation of the measured round trip delays and to calculate the differential delay by subtracting the derived upstream delay from the derived downstream delay.

In a still further possible embodiment of the apparatus according to the first aspect of the present invention, the optical signal at an upstream wavelength and the optical signal at a downstream wavelength are optical data signals of a bidirectional payload data channel within a predetermined wavelength band.

In a still further possible embodiment of the apparatus according to the first aspect of the present invention, the processing unit is configured to calculate the individual differential delays for each bidirectional payload data channel within the predetermined wavelength band.

In a still further possible embodiment of the apparatus according to the first aspect of the present invention, the measurement signal generator of the measurement unit is adapted to generate at least two measurement signals at predetermined wavelengths or at adjustable wavelengths.

In a further possible embodiment of the apparatus according to the first aspect of the present invention, the measurement wavelengths of the measurement signals are preconfigured or tuned to be in a wavelength region where the amplitude of the measurement signals transported through the optical transportation link and reflected back to the measurement unit is sensitive to attenuation caused by water absorption and/or bending of a fiber of the optical transportation link.

The invention further provides according to a second aspect a base station device comprising the features of claim 16.

The invention provides according to the second aspect a base station device comprising
a baseband unit,
a wavelength division multiplexer and an add/drop filter adapted to connect a measurement unit of the apparatus according to the first aspect of the present invention to a near end of the optical transportation link.

In a possible embodiment of the base station according to the second aspect of the present invention, the base station is connected via the optical transportation link to one or several remote devices each comprising a signal reflector configured to reflect at least partially the measurement signals inserted by the add/drop filter of the base station device at the near end of the optical transportation link.

In a still further possible embodiment of the base station according to the second aspect of the present invention, the remote device connected to the base station device comprises a wavelength division multiplexer connected to said signal reflector and remote radio heads.

The invention further provides according to a third aspect a method comprising the features of claim 19.

The invention provides according to the third aspect a method for providing a differential latency between an upstream transmission and a downstream transmission via an optical transmission link
the method comprising the steps of:
measuring round trip delays of at least two optical measurement signals having different measurement wavelengths, wherein the optical measurement signals are inserted at a near end of the optical transportation link transported through the optical transportation link to a far end of the optical transportation link and at least partially reflected at the far end of the optical transportation link back to the near end of the optical transportation link to measure the round trip delays of the at least two optical measurement signals;
deriving an upstream delay of the at least one optical signal at an upstream wavelength from the at least two measured round trip delays of the measurement signals, and
deriving a downstream delay of at least one optical signal at a downstream wavelength from the at least two measured round trip delays of the measurement signals; and
calculating the differential delay latency on the basis of the derived upstream delay and the derived downstream delay.

In a possible embodiment of the method according to the third aspect of the present invention, the measurement wavelengths of the at least two measurement signals are selected to be outside of a predetermined wavelength band used by payload channels transporting data through said optical transmission link.

In a further possible embodiment of the method according to the third aspect of the present invention, the at least two optical measurement signals comprise
at least one first optical measurement signal having a first measurement wavelength below the predetermined wavelength band and
at least one second optical measurement signal having a second measurement wavelength above the predetermined wavelength band.

In a further possible embodiment of the method according to the third aspect of the present invention, the upstream delay and the downstream delay are derived by linear or non-linear interpolation from the measured round trip delays of the optical measurement signals.

In a further possible embodiment of the method according to the third aspect of the present invention, the differential delay latency is calculated by subtracting the derived upstream delay and the derived downstream delay.

In a still further possible embodiment of the method according to the third aspect of the present invention, the at least two optical measurement signals are inserted at the near end of the optical transportation link by means of an add/drop filter and the reflected optical measurement signals are extracted at the near end of the optical transportation link by means of an add/drop filter.

In a still further possible embodiment of the method according to the third aspect of the present invention, the differential latency is compensated dynamically.

In a further possible alternative embodiment of the method according to the third aspect of the present invention, the differential latency is compensated statically.

In a further possible embodiment of the method according to the third aspect of the present invention, the measurement wavelengths of the at least two optical measurement signals are tuned in response to control signals.

In a further possible alternative embodiment of the method according to the third aspect of the present invention, the measurement wavelengths are predetermined wavelengths.

In a further possible embodiment of the method according to the third aspect of the present invention, the first measurement wavelength of the first optical measurement signal comprises a wavelength between 1280 nm and 1520 nm and the second measurement wavelength of the second optical measurement signal comprises a wavelength between 1610 nm and 1675 nm.

In a further possible embodiment of the method according to the third aspect of the present invention, the optical transportation link comprises a single fiber working or a dual fiber working.

The invention further provides according to a fourth aspect a wavelength division multiplexing system comprising the features of claim 24.

The invention provides according to the fourth aspect a wavelength division multiplexing system comprising at least one apparatus according to the first aspect of the present invention.

In a possible embodiment of the wavelength division multiplexing system, the WDM system is a coarse wavelength division multiplexing system, CWDM.

In an alternative embodiment of the WDM system according to the fourth aspect of the present invention, the WDM system is a dense wavelength division multiplexing system, DWDM.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
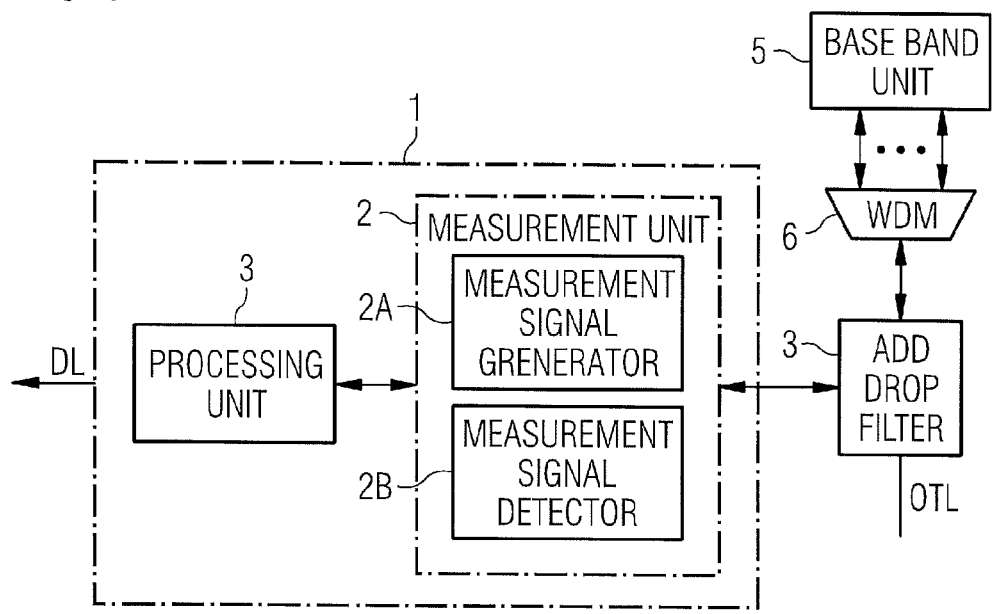
FIG. 1 shows a block diagram for a possible exemplary embodiment of an apparatus for providing a differential latency according to the first aspect of the present invention.

FIG. 1 shows a block diagram of a possible embodiment of an apparatus 1 for providing a differential latency DL according to a first aspect of the present invention. The apparatus 1 provides a differential latency DL between an upstream, US, transmission and a downstream, DS, transmission via an optical transmission link OTL. The apparatus 1 comprises a measurement unit 2 and a processing unit 3. The measurement unit 2 is configured to measure the round trip delays RTD of at least two measurement signals having different measurement wavelengths MW. The measurement unit 2 comprises in the shown embodiment a measurement signal generator 2A and a measurement signal detector 2B. The measurement signal generator 2A is configured to generate at least two optical measurement signals having different measurement wavelengths MW. The at least two generated optical measurement signals are inserted at a near end of the optical transportation link OTL by means of an add/drop filter 3 connected to the measurement unit 2. The at least two inserted optical measurement signals MSs are transported through the optical transportation link OTL to a far end of the optical transportation link OTL and are at least partially reflected by a signal reflector provided at the far end of the optical transportation link OTL back to the add/drop filter 3 provided at the near end of the optical transportation link OTL and supplied to the measurement unit 2. The measurement unit 2 comprises the measurement signal detector 2B. The measurement signal detector 2B is configured to detect the reflected optical measurement signals received by the add/drop filter 3 at the near end of the optical transportation link OTL.

The apparatus 1 further comprises the processing unit 3 connected to the measurement unit 2. The processing unit 3 is configured to derive an upstream delay of at least one optical signal at an upstream wavelength, USW, from the at least two measured round trip delays RTDs and to derive a downstream delay of the at least optical signal at a downstream wavelength, DSW, from the at least two measured round trip delays RTDs. The processing unit 3 is further configured to calculate the differential latency DL on the basis of the derived delays. The processing unit 3 outputs the calculated differential latency DL as illustrated in FIG. 1.

In a possible embodiment, the measurement signal generator 2A of the measurement unit 2 is configured to generate optical measurement signals comprising a pulse sequence having a narrow autocorrelation function in the time domain. The measurement signal detector 2B of the measurement unit 2 is adapted to detect the reflected optical measurement signals by performing an autocorrelation of the received reflected optical measurement signals with the generated transmitted optical measurement signals.

Figure 2:
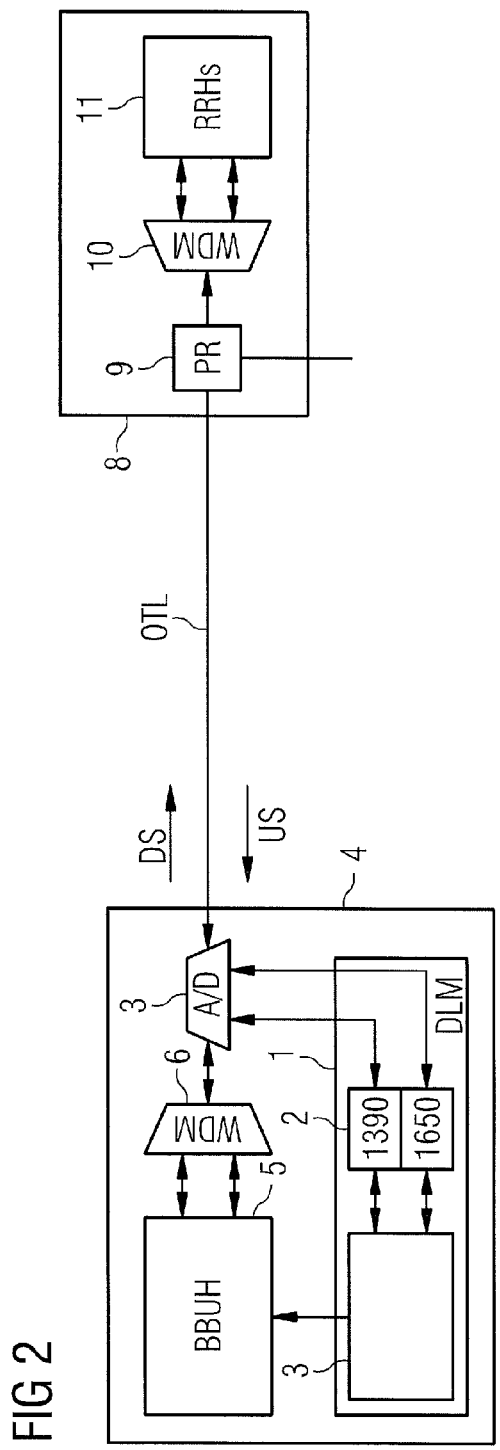
FIG. 2 shows a further block diagram for illustrating a possible embodiment of a base station according to a further aspect of the present invention.

The apparatus 1 as illustrated in FIG. 1 can in a possible embodiment be integrated in a base station device 4 as also illustrated in FIG. 2. The base station device 4 can comprise a baseband unit 5 and a wavelength division multiplexer 6 connected to the add/drop filter 3 as shown in FIG. 1. The add/drop filter 3 is adapted to connect the measurement unit of the apparatus 1 at the near end of the optical transportation link OTL.

Figure 6:
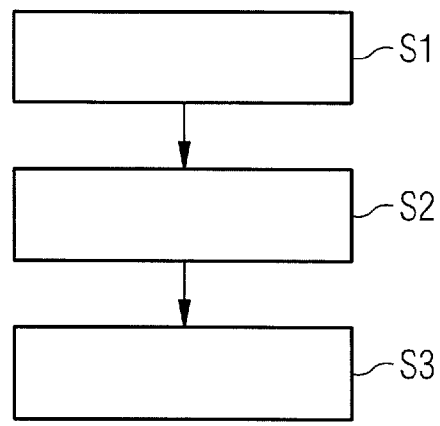
FIG. 6 shows a further flowchart illustrating a possible embodiment of a method according to a further aspect of the present invention.

FIG. 6 shows a flowchart of a possible exemplary embodiment of the method according to a first aspect of the present invention. The method provides a differential latency DL between an upstream transmission and a downstream transmission performed via an optical transmission link OTL. The method comprises several steps as illustrated in FIG. 6.

In a first step S1, round trip delays RTDs of at least two optical measurement signals having different measurement wavelengths MWs are measured. The generated optical measurement signals are inserted at a near end of the optical transportation link OTL, transported through the optical transportation link OTL to a far end of the optical transportation link OTL and at least partially reflected at the far end of the optical transportation link OTL back to the near end optical transportation link OTL to measure the round trip delays RTDs of the at least two optical measurement signals.

In a further step S2, an upstream delay of the at least one optical signal at an upstream wavelength USW from the at least two measured round trip delays RTDs of the measurement signals are derived. Further, a downstream delay of at least one optical signal at a downstream wavelength DSW from the at least two measured round trip delays RTDs of the measurement signals are derived in step S2.

In a final step S3, the differential delay DL is calculated on the basis of the derived upstream delay and the derived downstream delay.

FIGS. 7 to 10 show diagrams for illustrating different embodiments of the apparatus 1 as shown in FIG. 1 and of the method as illustrated in FIG. 6. FIGS. 7 to 10 show the group index $n_g$ of the optical transportation link OTL comprising an optical fiber being proportional to the round trip delay RTD depending on a signal wavelength $\lambda$. The group index $n_g$ depends on the signal wavelength $\lambda$ and can further depend on the temperature T and the type of the fiber used in the optical transportation link OTL.

The group velocity $V_G$ depends on the group index $n_g$ as follows:

$$V_G = C_0/n_g,$$

wherein $C_0$ is the vacuum velocity.

Consequently, the round trip delay RTD is given as follows:

$$RTD = 2 \cdot L_{OTL}/V_G,$$

wherein $L_{OTL}$ is the length of the optical transportation link OTL and $V_G$ is the group velocity.

Figure 7:
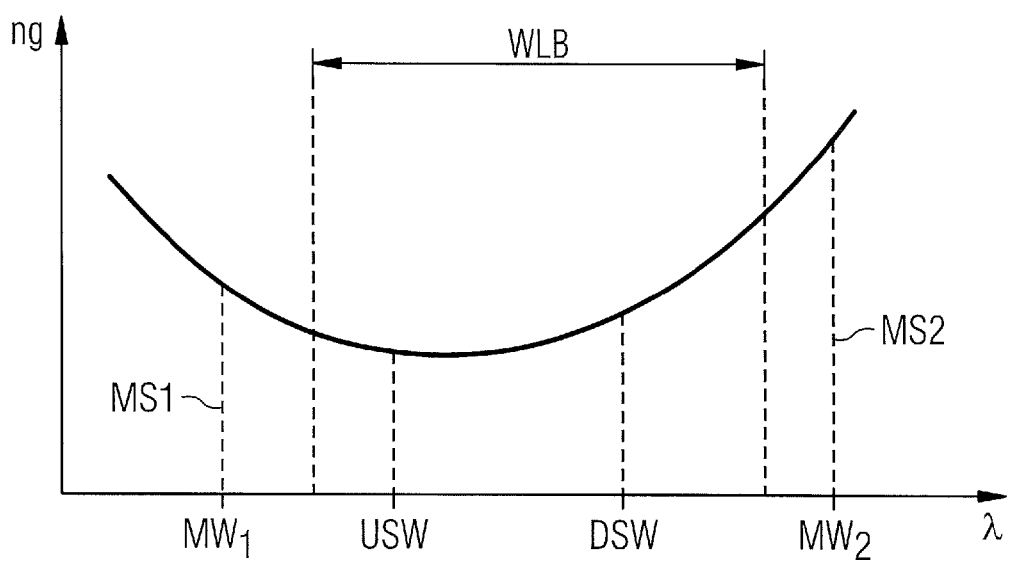
FIGS. 7, 8, 9, 10 show diagrams for illustrating possible exemplary embodiments of the method and apparatus according to the present invention.

The measurement signal generator 2A of the measurement unit 2 is adapted to generate at least two optical measurement signals having different measurement wavelengths MW1, MW2, as illustrated in FIG. 7. In a preferred embodiment, the measurement wavelengths MWs of the at least two measurement signals MSs are selected to be outside of a predetermined wavelength band WLB used by a payload channel transporting data through said optical transportation link OTL. In a possible embodiment of the method and apparatus according to the present invention, at least one first optical measurement signal MS1 has a first measurement wavelength MW1 below the predetermined wavelength band WLB and at least one second optical measurement signal MS2 has a second measurement wavelength MW2 above the predetermined wavelength band WLB as shown in FIG. 7. The at least two optical measurement signals with a wavelength below the predetermined wavelength band WLB and above the predetermined wavelength band WLB are inserted at the near end of the optical transportation link OTL and transported through the optical transportation link OTL to a far end of the optical transportation link OTL and at least partially reflected at the far end of the optical transportation link OTL back to the near end of the optical transportation link OTL to measure the round trip delays RTDs of the at least two optical measurement signals. In a further step, the upstream delay and the downstream delay are derived by linear or non-linear interpolation from the measured round trip delays RTDs of the at least two optical measurement signals. In a possible embodiment, the differential delay latency DL is calculated, for instance by the processing unit 3 of the apparatus 1 as shown in FIG. 1, by subtracting the derived upstream delay and the derived downstream delay. Accordingly, the processing unit 3 performs in a possible embodiment in a first step an interpolation from the measured round trip delays RTDs of the optical measurement signals and calculates then the differential delay latency DL by subtracting the derived upstream delay and the derived downstream delay. In case that only two optical measurement signals are used, the processing unit 3 can perform a linear interpolation from the measured round trip delays RTDs of the two optical measurement signals. In case that more than two optical measurement signals are used, the processing unit 3 can perform a non-linear interpolation from the measured round trip delays RTDs of the used optical measurement signals. In a possible embodiment, the at least two optical measurement signals are inserted at the near end of the optical transportation link OTL by means of the add/drop filter 3 as shown in FIG. 1 and the reflected optical measurement signals are extracted at the near end of the optical transportation link OTL by means of the same add/drop filter 3.

In a further possible embodiment of the method and apparatus according to the present invention, the measured differential latency DL is compensated. In a possible embodiment, the differential latency DL is compensated statically by using suitable patch cables. In an alternative embodiment, the differential latency DL is compensated dynamically in response to the measured differential latency DL. In a possible embodiment of the method and apparatus according to the present invention, the measurement wavelength MW of the at least two optical measurement signals are tuned in response to external control signals applied to the measurement signal generator 2A. In an alternative embodiment, the measurement wavelength MW of the optical measurement signals are preconfigured and fixed at predetermined wavelengths.

In a possible embodiment, the first measurement wavelength MW1 of the first optical measurement signal MS1 as shown in FIG. 7 comprises a wavelength between 1280 nm and 1520 nm. Further, the second measurement wavelength MW2 of the second optical measurement signal MS2 as shown in FIG. 7 can comprise a wavelength between 1610 nm and 1675 nm. In a possible embodiment, the wavelength band WLB can be in a wavelength range from 1530 nm and approximately 1610 nm.

Figure 8:
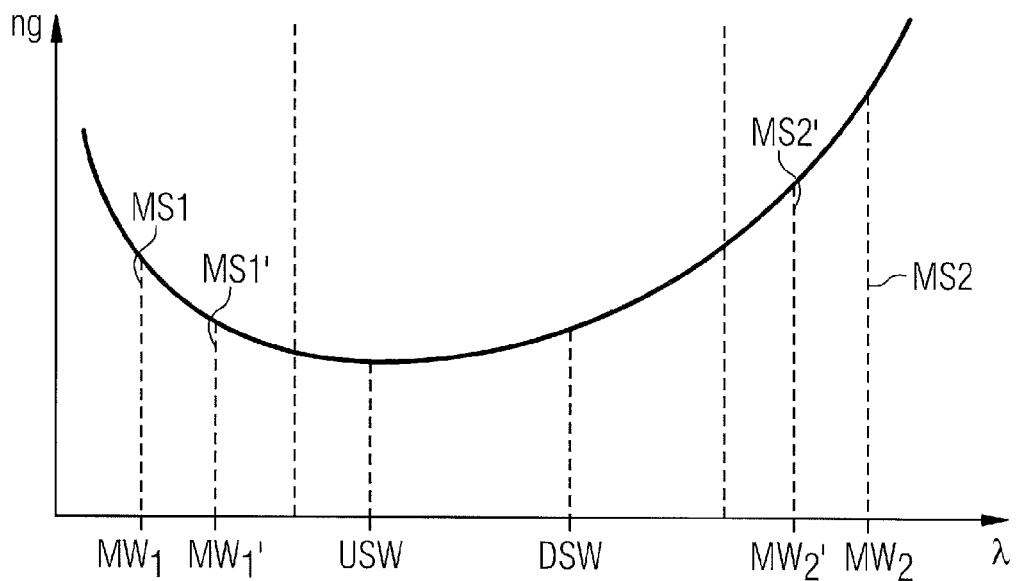

FIG. 8 illustrates a further possible embodiment of the method and apparatus according to the present invention. As can be seen in FIG. 8, in the illustrated embodiment, there are more than two measurement signals MS below and above the predetermined wavelength band WLB. In the embodiment shown in FIG. 8, there are two measurement signals having a measurement wavelength MW below the predetermined wavelength band WLB and two measurement signals having a measurement wavelength MW above the predetermined wavelength band WLB. As can be seen in FIG. 8, two measurement signals with measurement wavelengths MW1, MW1' are below the predetermined wavelength band WLB and two measurement signals with measurement wavelengths MW2, MW2' are above the predetermined wavelength band WLB.

In both embodiments illustrated in FIGS. 7, 8, there is an upstream signal with an upstream wavelength USW and a downstream signal with a downstream wavelength DSW within the wavelength band WLB. In the embodiments illustrated in FIGS. 7, 8, the measurement signals MSs have measurement wavelengths MWs outside the wavelength band WLB so that it can be guaranteed that they do not interfere with the upstream and downstream data signals at the upstream and downstream wavelengths USW, DSW. In the embodiment shown in FIG. 7, two measurement signals MS1, MS2 are used and the processing unit 3 of the apparatus 1 can perform a linear interpolation of the measured round trip delays RTDs and then calculate the differential delay DL by subtracting the derived upstream delay from the derived downstream delay. In the embodiment shown in FIG. 8, more than two measurement signals are used. In the shown embodiment, two measurement signals with measurement wavelengths MW1, MW1' below the predetermined wavelength band WLB and two measurement signals MS2, MS2' with measurement wavelengths MW2, MW2' above the predetermined wavelength band WLB are employed. It is also possible to use two measurement signals MS1, MS1' with measurement wavelengths MW1, MW1' below the predetermined wavelength band WLB and only one measurement signal MS2 with a measurement wavelength MW2 above the predetermined wavelength band WLB. In the same manner, it is also possible in a further embodiment, to employ only one measurement signal MS1 having a measurement wavelength MW1 below the predetermined wavelength and WLB and two optical measurement signals MS2, MS2' with two different measurement wavelengths MW2, MW2' above the predetermined wavelength band WLB. In the embodiments using more than two measurement wavelengths, the processing unit 3 of the apparatus 1 can perform a non-linear interpolation of the measured round trip delays RTDs and then calculate the differential delay by subtracting the derived upstream delay from the derived downstream delay. The non-linear interpolation can be performed by the processing unit using a predetermined or configurable non-linear interpolation function.

Figure 9:
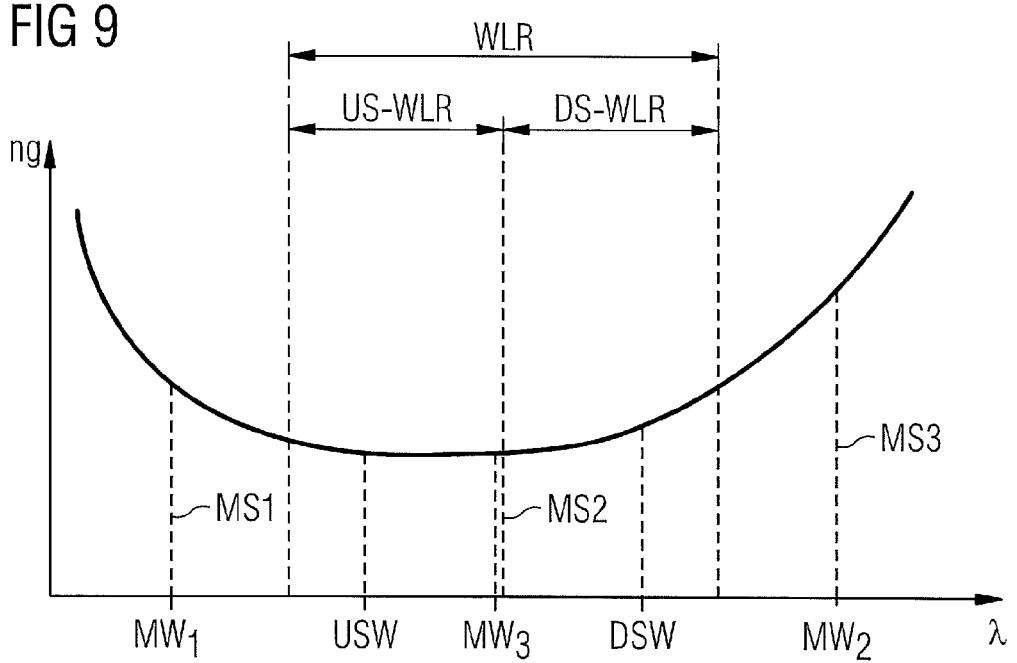

FIG. 9 shows a diagram for illustrating a further exemplary embodiment of the method and apparatus according to the present invention. In the diagram illustrated in FIG. 9, three measurement signals MS1, MS2, MS3 are used having three different measurement wavelengths MW1, MW2, MW3. In the shown exemplary embodiment, a predetermined wavelength band WLB is partitioned into an upstream wavelength band US-WLB of an upstream data transport and into a downstream wavelength band DS-WLB of a downstream data transport. The data transmission within the wavelength band WLB is performed upstream with a signal at an upstream wavelength USW and downstream with a signal at a downstream wavelength DSW as shown in FIG. 9. In the embodiment shown in FIG. 9, the third measurement signal MS3 has a third measurement wavelength MW3 in the middle of the wavelength band WLB between the upstream wavelength band US-WLB and the downstream wavelength band DS-WLB. Accordingly, in the embodiment shown in FIG. 9, the third measurement signal MS3 comprises a measurement wavelength MW3 within the predetermined wavelength band WLB of a frequency where it does not interfere with the upstream and downstream data transport via the optical transportation link OTL. The measurement unit 2 measures the round trip delays RTDs of the three measurement signals MS1, MS2, MS3 having different measurement wavelengths MW1, MW2, MW3. The processing unit 3 derives the upstream delay of the at least one optical signal at the upstream wavelength USW and the downstream delay of the at least one optical signal at the downstream wavelength DSW from the measurement round trip delays RTDs by performing a non-linear interpolation of the measured round trip delays RTDs of the three measurement signals MS1, MS2, MS3 having measurement wavelengths MW1, MW2, MW3.

Figure 10:
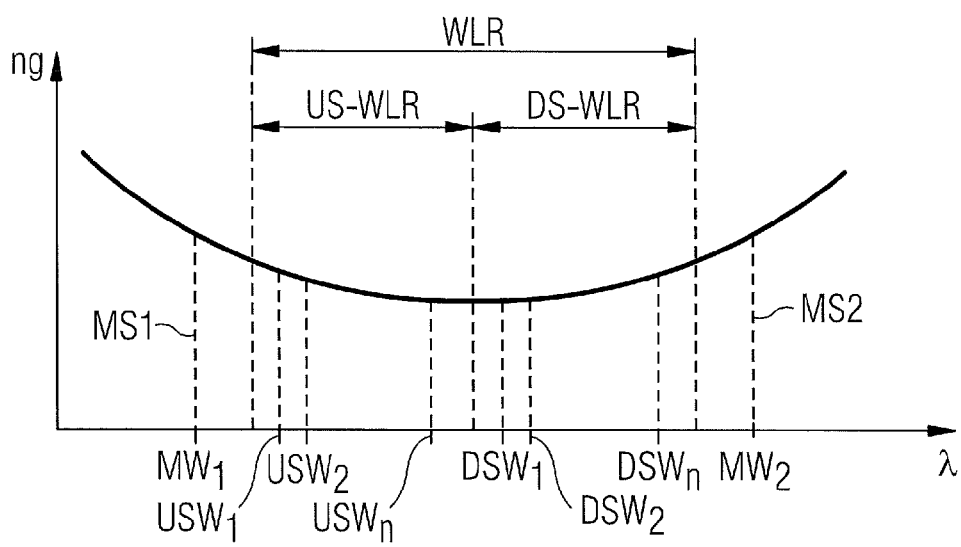

The optical signal at the upstream wavelength USW and the optical signal at the downstream wavelength DSW can be optical data signals of a bidirectional payload data channel within the wavelength band WLB. As illustrated in FIG. 10, the processing unit 3 of the apparatus 1 can be configured to calculate the individual differential delays $DL_i$ for several bidirectional payload data channels within the predetermined wavelength band WLB. In the embodiment, illustrated in FIG. 10, the system comprises n bidirectional payload data channels each transporting data upstream at an upstream wavelength $USW_i$ and transporting data downstream at a downstream wavelength $DSW_i$. In the embodiment, shown in FIG. 10, two measurement signals MS1, MS2 with measurement wavelengths MW1, MW2 are used. To increase the accuracy of the measurements more than two measurement signals can be used.

The embodiments illustrated in FIGS. 7, 8, 9, 10 can be combined. For instance, in the embodiment of FIG. 10, a third measurement signal MS3 having a third measurement wavelength MW3 can be used, wherein the third measurement wavelength MW3 can for example have a wavelength located between the upstream wavelength $USW_n$, of the $n^{th}$ data payload channel and the downstream wavelength DSW1 of the first bidirectional payload data channel. Further, measurement signals MSs below or above the wavelength band WLB can also be used. For example, in a possible embodiment, two measurement signals MS1, MS1' having measuring wavelengths MW1, MW1' below wavelength band WLB, two measurement signals MS2, MS2' with measuring wavelengths MW2, MW2' above the predetermined wavelength band WLB and a fifth measurement signal MS3 having a measurement wavelength MW3 in the middle of the wavelength band WLB can be used. With increasing number of measurement signals MS with different measurement wavelengths MW, the accuracy of the calculated differential delay DL can be increased.

In a possible embodiment of the method and apparatus according to the present invention, the measurement wavelengths MWs of the different measurement signals MSs can be preconfigured depending on the application and depending on the used optical fibers of the optical transportation link OTL.

In an alternative embodiment, the measurement wavelengths MWs of the different measurement signals MSs can be tuned by a control unit of the apparatus 1.

The amplitude of the measurement signals MSs transported through the optical transportation link OTL and reflected back to the measurement unit 2 can be in a possible embodiment also be sensitive to attenuation caused by water absorption. In optical fibers, a spectral loss can be caused by intrinsic effects and impurities. An attenuation peak in a wavelength region around 1400 nm can be caused by OH-ions. Depending on the used optical fibers, this attenuation peak can be pronounced. Further, an attenuation can be caused by bending losses, i.e. by macro-bending losses and micro-bending losses. Most optic waveguides do not only exhibit losses due to intrinsic effects and impurity but also exhibit losses caused by perturbations of its waveguide geometry. Such perturbations can result from bending a fiber of the optical transportation link. Losses caused by bending radii $R \gg \lambda$ are called macro-bending loss, whereas losses caused by a radius $R \approx \lambda$ is named micro-bending loss. Both kind of bending losses can result from an incorrect handling of the fibers, e.g. by incorrect cabling. In a possible embodiment, the measurement wavelengths MWs of the used measurement signals MSs are selected or tuned such that an attenuation caused by water absorption and/or bending of a fiber of the optical transportation link OTL can be detected. For instance, at least one measurement signal MS can comprise a measurement wavelength MW in a wavelength region around 1400 nm, i.e. close to an attenuation peak caused by water absorption. In this embodiment, the measurement signals MSs are not only used for calculating differential latency DL but also to measure an attenuation caused by external effects such as water absorption and/or bending of the fibers of the optical transportation link OTL.

In a possible embodiment of the method and apparatus according to the present invention, the measurement signal generator 2A of the measurement unit 2 is configured to generate optical measurement signals MSs comprising a pulse sequence providing a narrow autocorrelation function in the time domain. The measurement signal detector 2B of the measurement unit 2 is adapted to detect the reflected optical measurement signals by performing an autocorrelation of the received reflected optical measurement signals with the generated transmitted optical measurement signals.

With the method and apparatus according to the present invention, round trip delays RTDs measurements are performed on the basis of measurement signals with at least two different measurement wavelengths MWs. The round trip delay RTD is measured by means of partial reflectors which are located at the far end of the respective optical transportation link OTL. A suitable time-resolving technique, e.g. a correlation technique with suitable precision of the time resolution, can be employed. In a preferred embodiment, the measurement wavelengths MWs of the RTD measurements are below and above the predetermined wavelength band WLB which is used for the payload data channels. Accordingly, with the method and apparatus according to the present invention, the measurements can be performed simultaneously with payload data transport, i.e. non-intrusively. From the two measurements, the round trip delay RTD for signals having wavelengths between the measurement wavelengths MWs can be derived. In a possible embodiment, the measurement wavelengths are selected such that the derived round trip delays RTDs are independent of the fiber type of the optical fiber and covers a relevant wavelength band WLB with a very small error, for instance with an error of less than 1ns. By selecting the measurement wavelengths MWs of the measurement signal, accordingly, it is also possible with the method and apparatus according to the present invention to detect fiber degradation caused by macro-bending and/or water-peak absorption. In a possible embodiment, the payload wavelength of the data channels can be in the C-, L- and S-band or can also form part of the E-band. In a possible embodiment, further measurement signals having a measurement wavelength MW specifically adapted for water-peak absorption measurement can also be used.

In a possible embodiment of the method and apparatus according to the present invention, the used signal reflector at the far end of the optical transportation link can be a fiber Bragg grating adapted to reflect the at least two optical measurement signals MSs transported through the optical transportation link OTL. Fiber Bragg gratings are filter and can be used in a WDM system. Generally, a fiber Bragg grating FBG is a periodic perturbation in the propagating medium (periodic variation of the refractive index). In FBGs, this perturbation can be written into the fiber by means of a UV laser. The advantages of fiber Bragg gratings FBGs include low loss (down to 0.1 decibel), ease of coupling to transmission fibers, polarization insensitivity and a high crosstalk suppression.

FIG. 2 shows a block diagram for illustrating a possible arrangement comprising the apparatus 1 according to the present invention. FIG. 2 illustrates an exemplary embodiment of a base station device 4 comprising an apparatus 1 for providing a differential latency DL according to the first aspect of the present invention, an add/drop filter 3 adapted to connect the measurement unit 2 of the apparatus 1 to a near end of the optical transportation link OTL as shown in FIG. 2. The apparatus 1 further comprises a processing unit 3 which can supply the calculated differential latency DL to a baseband unit 5 connected via a wavelength division multiplexer 6 to the add/drop filter 3. The base station 4 as shown in FIG. 2 is connected via the optical transportation link OTL to one or several remote devices 8 each comprising a signal reflector 9 configured to reflect at least partially the measurement signals MSs inserted by the add/drop filter 3 of the base station device 4 at the near end of the optical transportation link OTL. The signal reflector 9 is formed in a possible embodiment by a fiber Bragg grating FBG. As can be seen in FIG. 2, the signal reflector 9 is located at the far end of the optical transportation link OTL. The remote device 8 further comprises in the shown embodiment a wavelength division multiplexer 10 connected to the signal reflector 9. The remote device 8 further comprises remote radio heads 11 as shown in FIG. 2. In a possible embodiment, the method and apparatus according to the present invention can be used in a CPRI interface. The remote radio heads RRHs 11 can be connected to the baseband unit 5 using the common public radio interface CPRI. In a possible embodiment, the measurement signals MSs with the measurement wavelengths MWs can be inserted into the optical transportation link OTL directly at the transmission fiber interface at the head end. In a possible embodiment, low-loss add/drop filters 3 for the different measurement wavelengths MWs can be used. At the far end of the optical transportation link OTL, a partial reflector 9 can reflect a certain percentage of the received measurement signals back to the near end. In a possible embodiment, the reflected percentage of the signal can be optimized to provide a clear measurement. The partial reflector 9 can consist of a fiber Bragg grating FBG which reflects both measurement wavelength ranges.

Figure 3:
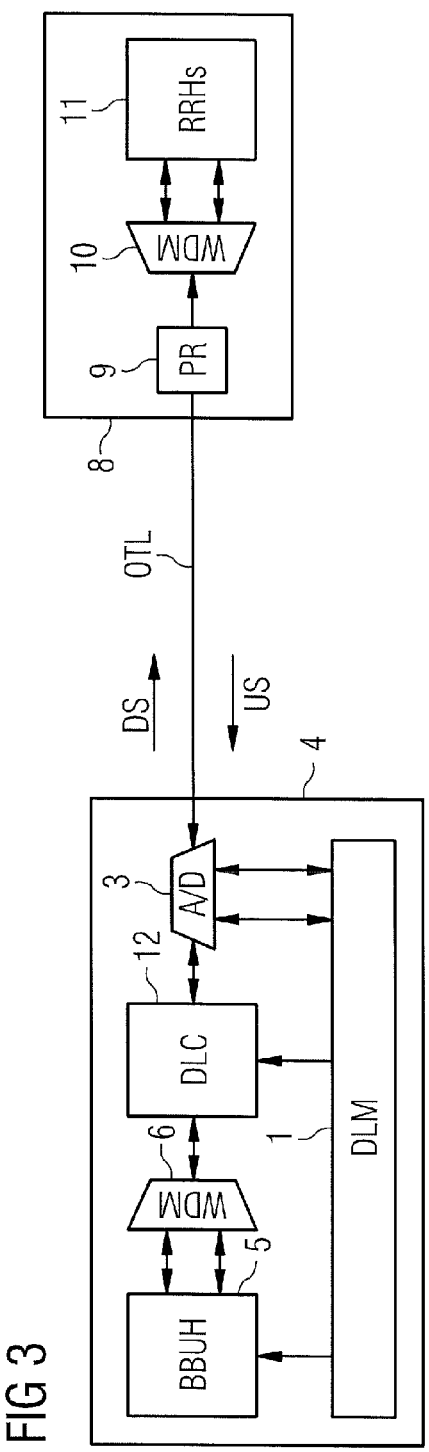
FIG. 3 shows a further block diagram for illustrating a further possible embodiment of the base station device according to the present invention.

In a possible embodiment, the method and apparatus according to the present invention can perform a compensation of the calculated differential latency DL. In a possible embodiment as shown in FIG. 3, the base station device 4 comprises a differential latency compensation unit 12 configured to compensate the calculated differential latency DL output by the apparatus 1. In the embodiment shown in FIG. 3, the differential latency compensation unit 12 can compensate the calculated differential latency dynamically in response to the differential latency DL output by the processing unit 3 of the apparatus 1. In an alternative embodiment, the differential latency compensation DLC is performed statically. In a possible embodiment, the static differential latency compensation, DLC, is based on suitable patch cables. The respective, patch cable length can be derived from the differential latency measurement. In the embodiment illustrated in FIG. 3, the differential latency compensation DLC is performed dynamically, i.e. automatically in response to the calculated differential latency DL output by the processing unit 3 of the apparatus 1. In a possible embodiment, the differential latency compensation DLC can comprise the steps of separation of direction of signal transmission (upstream US/downstream DS) and provide variable delays for both transmission directions, e.g. based on suitable optomechanics. In a possible embodiment, the differential latency compensation DLC is performed individually for each bidirectional wavelength pair of a bidirectional payload channel. In a possible embodiment, the differential latency compensation DLC can be performed by a differential latency compensation unit which forms part of the functionality of the baseband unit 5. In a possible embodiment, the baseband unit 5 can be a baseband unit hotel BBUH.

Figure 4:
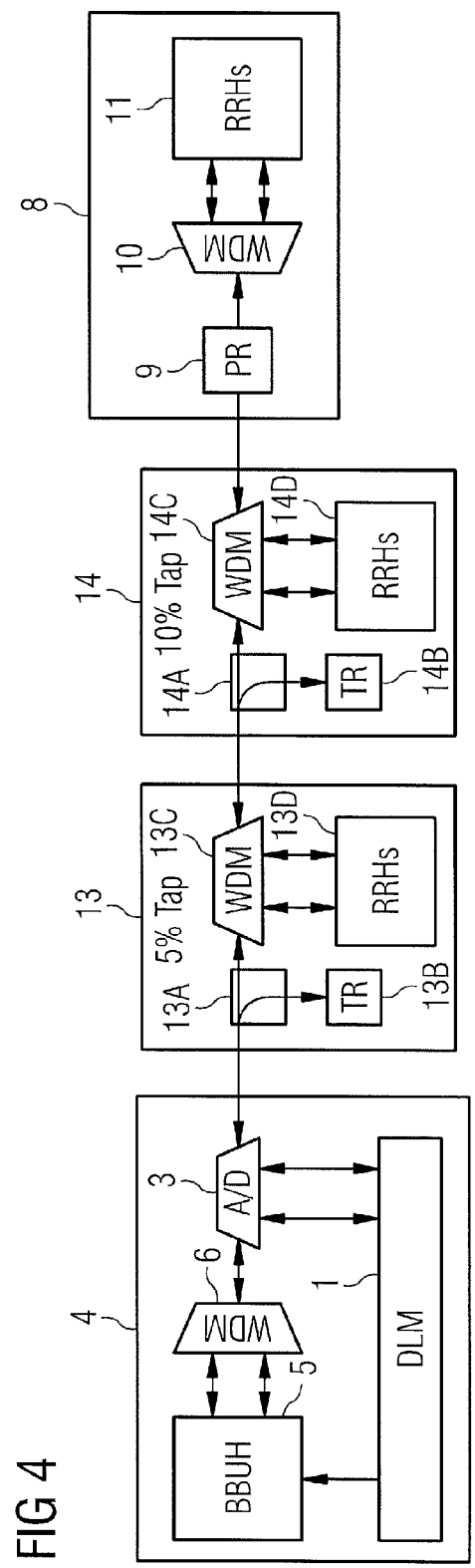
FIG. 4 shows a further block diagram for illustrating a further possible embodiment of a system comprising a base station device according to an aspect of the present invention.

FIG. 4 shows a further exemplary embodiment of a system comprising a base station device 4 with an integrated apparatus 1 for differential latency measurement DLM according to the present invention. In the shown exemplary embodiment, the remote device 8 is connected to the base station device 4 via one or several nodes 13, 14. With the arrangement shown in FIG. 4, it is possible to measure differential delays DL for several different nodes. Each intermediate node 13, 14 is adapted to pass through the received differential latency measurement signals with the different measurement wavelengths MWs, e.g. a first measurement signal at a measurement wavelength of 1390 nm and a second measurement signal at a measurement wavelength of 1650 nm. As can be seen in FIG. 4, the intermediate nodes 13, comprise signal taps 13A, 14A connected to a total of signal reflectors 13B, 14B. Different degrees of DLM signal reflection can be employed for instance at a 5% power tap and/or at a 10% power tap. The different taps 13A, 14A are used to compensate for fiber attenuation increasing with distance. In the exemplary embodiment illustrated in FIG. 4, the first signal tap 13A provides a power tap of 5% and the second signal tap 14A provides a power tap of 10% of the received signal. If the DLM signal sequence, i.e. the generated optical measurement signals MSs, comprising a DLM signal sequence which is short compared to the inter-node distances, the different nodes can be discriminated. As can be seen in FIG. 4, each intermediate node 13, 14 can also comprise a WDM multiplexer 13C, 14C and remote radio heads 13D, 14D.

Figure 5:
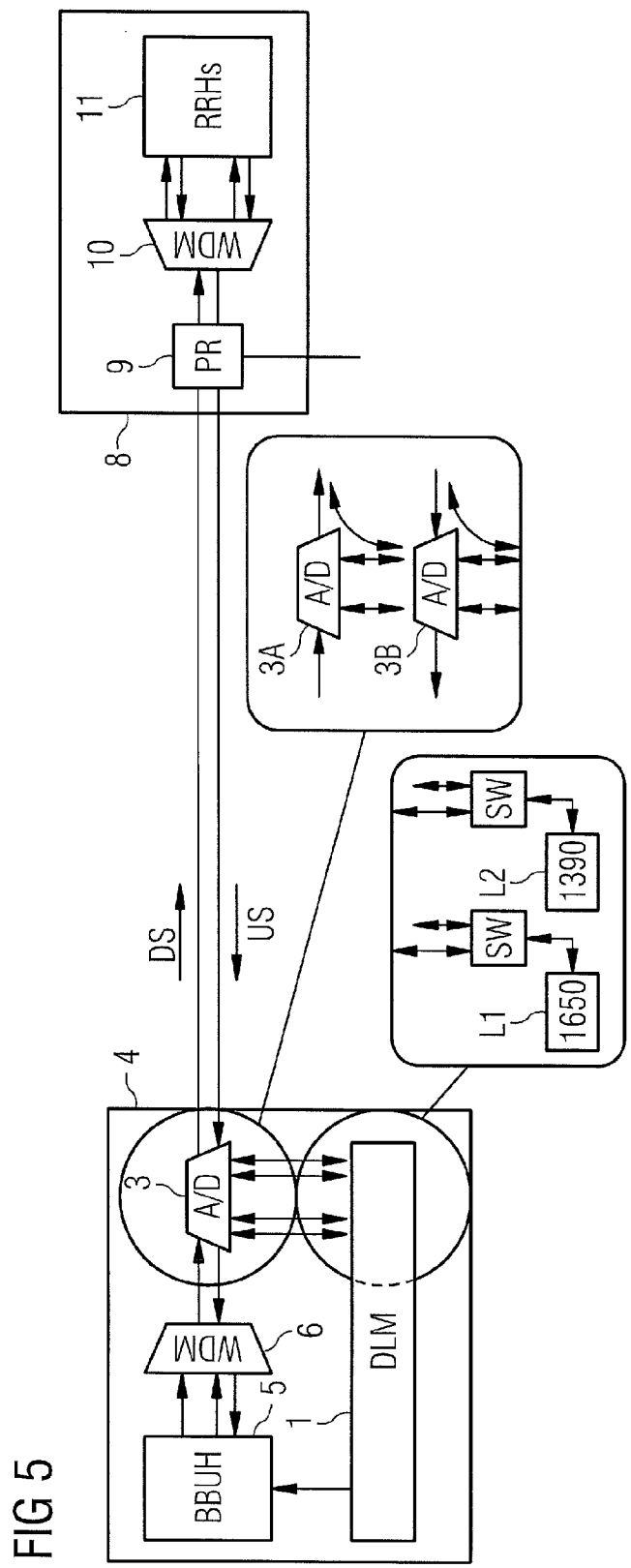
FIG. 5 shows a further diagram for illustrating a further exemplary embodiment of a system comprising the base station device according to an aspect of the present invention.

FIG. 5 illustrates a further arrangement using the base station device 4 according to the present invention with dual fiber working DFW. In the shown embodiment, the optical transportation link OTL comprises two fibers of the same fiber type, wherein the first fiber is used for downstream data transmission and the other optical fiber is used for upstream data transmission. For each fiber, a partial reflector 9 can be provided at the remote device 8. For each data stream direction, a corresponding add/drop filter 3A, 3B can be used as illustrated in FIG. 5. Laser L1, L2 of the measurement signal generator 2A within the apparatus 1 of the base station device 4 can be switched by corresponding switches SW to the add/drop filters 3A, 3B as shown in FIG. 5. In dual fiber working DFW, the same upstream US and downstream DS wavelengths are typically used. With the arrangement according to the present invention, it can be ensured that the measurement wavelength MW show a near zero differential latency DL. It can be expected that the payload signals have a similar differential latency. Otherwise, the scheme can detect a fiber-length mismatch which then can be compensated. In addition, fiber degradation can be detected. For instance, in the lower measurement wavelength, changes in the water-peak range can be detected. In the higher measurement wavelength, changes due to macro-bending of the fibers can be detected. In case that different wavelengths are used for the upstream US and downstream DS wavelengths in dual fiber working DFW, the method and apparatus according to the present invention can be used to calculate the differential latency DL between the wavelengths and the fibers. The measurement wavelengths MWs can be adapted to the generic fiber type of the optical fiber used in the optical transportation link OTL.

The method and apparatus according to the present invention can be extended to a broader (payload) wavelength range. In this case, a priori fiber-type knowledge is required to be able to extend (calculate) the group index (or group velocity) to a range that also covers a dispersion D<0. The method and apparatus can be used for single fiber working SFW but also for dual fiber working DFW as shown in FIG. 5. The method and apparatus according to the present invention can even be used for DFW without using the same wavelengths for upstream US and downstream DS. If in DFW, the same wavelengths are used for upstream US and downstream DS, the choice of the measurement wavelengths is relatively relaxed and the method can be used for detection of fiber degradation. Fiber degradations can also be detected in single fiber working SFW, however, this may be limited by the measurement wavelength choice for some optical fiber types. The method and apparatus according to the present invention can also be extended to RTD measurements for several nodes from a linear add/drop link as illustrated in FIG. 4.

The method and apparatus according to the present invention can be used in a wavelength division multiplexing, WDM, system of a telecommunications network. Telecommunications networks can be hierarchically organized. Residential and business access can be based on wireless (2G/3G, 4G and WiFi) and wireline, fiber point-to-point (P2P) and point-to-multipoint passive optical networks (PONs), copper-twisted pair or HFC technologies. Access concentrators such as base stations are a backhaul to aggregation sites of a first level. These sites are often referred to as local exchanges (LX) or sample offices. In a possible embodiment, this backhaul is based on a coarse wavelength division multiplexing CWDM, dense wavelength division multiplexing DWDM or passive WDM. In addition to access and backhaul, there can be a mobile fronthaul or cloud radio access networks C-RANs in LTE advanced networks. Several baseband units can be concentrated in so-called baseband unit hotels BBUHs and connected to their respective antennas via digital CPRI high-speed links. These CPRI links have tight latency and jitter requirements and they are run therefore via a point-to-point fiber or wavelength division multiplexing WDM channels. According to a further aspect of the present invention, a wavelength division multiplexing WDM system is provided comprising an apparatus for calculating a differential latency DL between upstream transmission and downstream transmission via an optical transmission link OTL used in such a telecommunications network. In a possible embodiment, the WDM system according to the present invention is a coarse wavelength division multiplexing (CWDM) system. In an alternative embodiment, the WDM system can be formed by a dense wavelength division multiplexing (DWDM) system. The method and apparatus according to the present invention allow differential latency measurement for the transmission fiber including WDM-related effects. It can be used in differential latency measurement of a CPRI fronthaul. With the method and apparatus according to the present invention, reflected measurement signals are used. An advantage of the method and apparatus according to the present invention is that the length of the optical transmission link OTL does not have an impact on the differential latency measurement. The employed measurement signal can be any modulated pulse signal, in particular pulse signals providing a narrow autocorrelation function in the time domain. The method according to the present invention as illustrated in FIG. 6 can be implemented by a program executable by a microprocessor. In a possible embodiment, the optical measurement signals MSs, in particular their measurement wavelengths MWs, are configurable. In a possible embodiment, the parameters of the optical measurement signals MSs are configured in response to received control signals provided by a control unit of the apparatus 1.

The invention claimed is:

1. An apparatus for providing a differential latency between an upstream transmission and a downstream transmission of optical data signals of a bidirectional payload channel at upstream and downstream wavelengths within a wavelength band via an optical transmission link, said optical transmission link comprising an optical fiber having a group index proportional to a round trip delay depending on a signal wavelength, said apparatus comprising:
  (a) a measurement circuit configured to measure the round trip delays of at least two measurement signals having different measurement wavelengths; and
  (b) a processor configured to derive an upstream delay of at least one optical data signal at the upstream wavelength from the at least two measured round trip delays of the measurement signals and to derive a downstream delay of at least one optical data signal at the downstream wavelength from the at least two measured round trip delays of the measurement signals by linear or non-linear interpolation of the measured round trip delays of the measurement signals, wherein the differential latency is calculated by said processor by subtracting the derived upstream delay from the derived downstream delay, wherein the measurement wavelengths of the measurement signals are preconfigured or tuned to be in a wavelength region where the amplitude of the measurement signals transported through the fiber of the optical transportation link and reflected back to the measurement circuit are sensitive to attenuation caused by water absorption and/or bending of a fiber of the optical transportation link.

2. The apparatus according to claim 1, wherein the measurement circuit comprises a measurement signal generator configured to generate the at least two optical measurement signals having different measurement wavelengths.

3. The apparatus according to claim 2, wherein the measurement signal generator of the measurement circuit is adapted to generate at least two measurement signals at predetermined wavelengths or at adjustable wavelengths.

4. The apparatus according to claim 2, wherein the measurement signal generator of the measurement circuit is configured to generate optical measurement signals comprising a pulse sequence providing a narrow autocorrelation function in the time domain.

5. The apparatus according to claim 1, wherein the at least two generated optical measurement signals are inserted at a near end of an optical transportation link by means of an add/drop filter connected to the measurement circuit.

6. The apparatus according to claim 5, wherein the at least two inserted optical measurement signals are transported through the fiber of the optical transportation link to a far end of the optical transportation link and at least partially reflected by a signal reflector provided at the far end of the optical transportation link back to the add/drop filter provided at the near end of the optical transportation link and supplied to the measurement circuit.

7. The apparatus according to claim 6, wherein the measurement circuit comprises a measurement signal detector configured to detect the reflected optical measurement signals received by the add/drop filter at the near end of the optical transportation link.

8. The apparatus according to claim 7, wherein the measurement signal detector of the measurement circuit is adapted to detect the reflected optical measurement signals by performing an autocorrelation of the received reflected optical measurement signals with the generated transmitted optical measurement signals.

9. The apparatus according to claim 6, wherein the signal reflector at the far end of the optical transportation link is a fiber Bragg grating adapted to reflect the at least two optical measurement signals transported through said optical transportation link.

10. The apparatus according to claim 1, wherein the apparatus further comprises a differential latency compensation unit configured to compensate the calculated differential latency.

11. The apparatus according to claim 10, wherein the differential latency compensation unit is configured to compensate the calculated differential latency statically or dynamically in response to the calculated differential latency output by the processor of said apparatus.

12. The apparatus according to claim 1, wherein the processor is configured to calculate the individual differential delays for each bidirectional payload data channel within the predetermined wavelength band.

13. A base station device, comprising a baseband unit, a wavelength division multiplexer and an add/drop filter adapted to connect a measurement circuit of the apparatus according to claim 1 to a near end of an optical transportation link.

14. The base station device according to claim 13, wherein the base station device is connected via the optical transportation link to one or several remote devices each comprising a signal reflector configured to reflect at least partially the measurement signals inserted by the add/drop filter of the base station device at the near end of the optical transportation link.

15. The base station device according to claim 14, wherein the remote device connected to the base station device comprises a wavelength division multiplexer connected to said signal reflector and remote radio heads.

16. A wavelength division multiplexing system comprising at least one apparatus according to claim 1.

17. The WDM system according to claim 16, wherein the WDM system is a coarse wavelength division multiplexing or a dense wavelength division multiplexing system.

18. The apparatus according to claim 1, wherein the round trip delay is proportional to the group index ($n_g$) as follows: $=2L_{OTL} \cdot n_g/c_o$, wherein $L_{OTL}$ is the length of the optical transportation link and $c_0$ is the vacuum velocity.

19. The apparatus according to claim 1, wherein the first measurement wavelength of the first optical measurement signal comprises a wavelength between 1280 nm and 1520 nm and wherein the second measurement wavelength of the second optical measurement signal comprises a wavelength between 1610 nm and 1675 nm.

20. A method for providing a differential latency between an upstream transmission and a downstream transmission of optical data signals of a bidirectional payload channel at upstream and downstream wavelengths within a wavelength band via an optical transmission link, said optical transmission link comprising an optical fiber having a group index proportional to the round trip delay depending on a signal wavelength, the method comprising the steps of:

(a) measuring round trip delays of at least two optical measurement signals having different measurement wavelengths; wherein the optical measurement signals are inserted at a near end of the optical transportation link transported through the optical transportation link to a far end of the optical transportation link and at least partially reflected at the far end of the optical transmission link back to the near end of the optical transmission link to measure the round trip delays of the at least two optical measurement signals, wherein the measurement wavelengths of the measurement signals are preconfigured or tuned to be in a wavelength region where the amplitude of the measurement signals transported through the fiber of the optical transportation link and reflected back is sensitive to attenuation caused by water absorption and/or bending of a fiber of an optical transportation link;

(b) deriving an upstream delay of the at least one optical data signal at an upstream wavelength from the at least two measured round trip delays of the measurement signals; and deriving a downstream delay of the at least one optical data signal at a downstream wavelength from the at least two measured round trip delays of the measurement signals by linear or non-linear interpolation of the measured round trip delays of the measurement signals; and (c) calculating the differential delay latency on the basis of the derived upstream delay and the derived downstream delay by subtracting the derived upstream delay from the derived downstream delay.

21. The method according to claim 20, wherein the measurement wavelengths of the at least two measurement signals are selected to be outside of the predetermined wavelength band used by payload channels transporting data through said optical transmission link.

22. The method according to claim 21, wherein the at least two optical measurement signals comprise at least one first optical measurement signal having a first measurement wavelength below the predetermined wavelength band and at least one second optical measurement signal having a second measurement wavelength above the predetermined wavelength band.

23. The method according to claim 22, wherein the first measurement wavelength of the first optical measurement signal comprises a wavelength between 1280 nm and 1520 nm and wherein the second measurement wavelength of the second optical measurement signal comprises a wavelength between 1610 nm and 1675 nm.

24. The method according to claim 20, wherein the at least two optical measurement signals are inserted at the near end of the optical transmission link by means of an add/drop filter and the reflected optical measurement signals are extracted at the near end of the optical transmission link by means of an add/drop filter.

25. The method according to claim 20, wherein the differential latency is compensated dynamically or statically.

26. The method according to claim 20, wherein the measurement wavelengths of the at least two optical measurement signals are tuned in response to control signals or wherein the measurement wavelengths are predetermined wavelengths.

27. The method according to claim 20, wherein the optical transmission link comprises a single fiber working.

* * * * *